United States Patent

Stahn

[15] 3,640,024
[45] Feb. 8, 1972

[54] DEVICE FOR ADJUSTING THE POSITION OF A GRINDING WHEEL RELATIVE TO A WORKPIECE

[72] Inventor: Georg Stahn, Berlin, Germany
[73] Assignee: Firma Herbert Lindner GmbH, Berlin, Germany
[22] Filed: Jan. 20, 1970
[21] Appl. No.: 4,222

[30] Foreign Application Priority Data

Apr. 10, 1969 Germany............................P 19 18 784.9

[52] U.S. Cl.................................................51/165.87, 51/5
[51] Int. Cl.........................................................B24b 49/18
[58] Field of Search...............................51/165.87, 165.88, 5

[56] References Cited

UNITED STATES PATENTS

| | | | |
|---|---|---|---|
| 2,545,730 | 3/1951 | Fouquet | 51/165.87 X |
| 2,720,062 | 10/1955 | Fouquet | 51/165.87 |
| 2,944,373 | 7/1960 | Mentley et al. | 51/165.87 X |
| 3,137,103 | 6/1964 | Stade et al. | 51/165.87 |

Primary Examiner—Lester M. Swingle
Attorney—McGlew and Toren

[57] ABSTRACT

A device for adjusting the position of a grinding wheel relative to a workpiece in order to automatically compensate for the change in diameter in the grinding wheel during the trimming thereof by a trimming tool includes a gear connection between a trim spindle which is engageable with a nut on a trim carriage for shifting a trimming tool relative to the grinding wheel and to an adjusting spindle which is threaded into an adjusting nut carried on the grinding wheel carriage. The construction includes braking means for holding the gearing and the associated adjusting nut during the times at which the adjusting spindle is rotated for shifting the carriage, for example, by actuation of a hand wheel. The brake may be released during the time at which the trim spindle is rotated to shift the trim carriage in order to dress the surface of the grinding wheel and during this time the adjusting spindle will rotate relative to the adjusting nut so that the position of the adjusting nut with the carriage will be shifted in respect to the spindle by an amount corresponding to the movement of the dressing tool during the dressing operation.

10 Claims, 2 Drawing Figures

Inventor:
GEORG STAHN

DEVICE FOR ADJUSTING THE POSITION OF A GRINDING WHEEL RELATIVE TO A WORKPIECE

SUMMARY OF THE INVENTION

This invention relates in general to grinding devices, and in particular, to a new and useful device for adjusting the grinding wheel in order to automatically compensate for the abrasion or wearing down of the grinding wheel which is caused during the trimming thereof.

The present invention is particularly applicable to thread grinding machines which include an adjusting spindle for shifting the grinding wheel carriage as well as a trimming spindle for shifting a trimming carriage to move a trimming tool in to and out of association with the surface of a grinding wheel. Compensation for the abrasion of the grinding wheel by the trimming operation is effected in the known devices simultaneously with the trimming of the grinding wheel since the trimming carriage which carries the trimming tool acts during its trimming movement on the adjusting gear of the grinding spindle carriage to readjust the latter by the same amount so that the grinding wheel bears on the workpiece with exactly the same diameter both before and after the trimming. Devices of this character have a single spindle with two oppositely directed thread sections, one of the thread sections being associated with the adjusting nut and the other with the spindle nut of the trim carriage. One hand wheel is provided for rotating the trim spindle and the compensation operation and another hand wheel is provided for the adjusting operation. Both hand wheels act through worm gears on the spindles and the stationary adjusting nut which is rotatable mounted in the machine bed. In order to make a worm gear self-locking against back rotation, the pitch of the worm must be equal to or less than from 3 to 3½ degrees for the standstill operation. By meeting this requirement a great reduction of speed of the two hand wheels is required and this is disadvantageous for the adjusting and trimming operation. The great reduction in speed results in a great feeding movement on the hand wheels which impairs the readability of the trimming amount and adjusting amount. The known devices thus have the disadvantage that they are confined to certain transmission ratios and they are not satisfactory from the standpoint of the adjustment accuracy which can be obtained. For example, accuracies 1/1,000 mm. cannot be achieved with the known devices. In addition, the known devices cannot be used in a grinding machine of the most common type which includes an adjusting spindle as well as a trimming spindle.

There are other known devices in which the adjusting and compensation movements are effected by levers. A two arm lever is employed for example, to engage the spindle nut and it is supported in the nut and articulated through engagement of oblong slots over journals of the main adjusting carriage and the trimming carriage. The inaccuracies which result because of wear of the operating parts of such devices will manifest themselves in cumulative errors. Lever transmissions therefore have proved unsuitable for compensating devices because they do not meet todays requirements for high accuracy.

A further arrangement which is known for adjusting such devices, includes a friction cone clutch for the feed spindle and a friction clutch for the driving spindle which are biased by a tension spring into engagement with the associated driven part to transmit both the trimming and the compensating movement simultaneously through a common gear to both the trimming tool spindle and the adjusting spindle. Each of these spindles can also be driven individually. The two clutches on the adjusting spindle and on the trimming spindle which are provided on the compensation drive can also produce inaccuracies since a clearance may appear during operation which changes the accuracy of the trimming result and of the compensation therefor.

In accordance with the present invention, there is provided an arrangement which comprises a gear connection between a trim spindle which is rotatable to drive a trim carriage and an adjusting spindle which is threadably engaged in a rotatable nut carried on the grinding wheel carriage. The arrangement includes a hydraulic brake for locking the gearing and the associated adjusting nut on the grinding wheel carriage during the adjusting movement of the carriage by rotation of the adjusting spindle. When the trimming operation is to be carried out the drive gearing is released so that a corresponding rotation of the adjusting nut is produced which changes the relative position of the carriage and the nut in respect to the adjusting spindle by an amount corresponding to the movement of the trim tool carriage. In the preferred form the locking means comprises a hydraulic brake system which prevents rotation of the gear in the gear transmission which is directly associated with the adjusting nut, and which is, in turn, rotatably supported on the grinding wheel carriage. The construction ensures that the trimming accuracy and the adjusting accuracy are considerable improved over the prior art devices and by relative by simple means. The arrangement ensures that only short feed paths are required for the adjustment and the trimming. Because the locking of the gear transmission is not effected through a worm gear construction, it is no longer confined to a specific transmission ratio between the adjusting spindle and the trim carriage spindle.

The grinding wheel carriage is adjusted, for example, by the rotation of a hand wheel which drives the adjusting spindle through a suitable gear connection when the adjusting nut is locked in respect to the associated grinding wheel carriage. When it is necessary to trim the grinding wheel the brake is released and the wheel is trimmed by turning a trimming spindle by a suitable amount to advance the trimming tool into the surface of the grinding wheel. The gear transmission between the trimming spindle changes the setting of the carriage and its associated adjusting nut in respect to the adjusting spindle by rotating the adjusting nut relative to the spindle through the gearing. The amount of shifting of the carriage along its adjusting spindle may be substantially identical with the mount of rotation of the trimming tool spindle by providing a gear transmission ratio of one, but different transmission ratios may be provided for example to accommodate for different pitches of the trimming spindles and adjusting spindles. The gear connection between the two spindles permit very high accuracy of the compensating device for shifting the grinding wheel carriage.

In accordance with a feature of the invention the adjusting nut for the adjusting spindle is designed as a part of the hydraulic brake system. The nut itself, may be designed as a piston member or it may advantageously include a separate portion which surrounds an exposed end of the connecting gear for the gear transmission system. In each construction, the hydraulic brake includes means for locking the nut so that the driving of the trim spindle will effect a displacement of the nut with the carriage along the adjusting spindle by a corresponding amount. The brake advantageously includes a piston which is pressed by oil pressure against the end face of one of the gears of the driving system. The adjusting nut is thus braced with the grinding carriage in the shortest way and the respective compensation path is therefore transmitted with high accuracy to the grinding carriage.

Accordingly, it is an object of the invention to provide an improved grinding machine which includes a grinding wheel carriage for the grinding wheel which is movable toward and away from the workpiece to be ground and a trim tool carriage adapted to have a tool member which is movable toward and away from engagement with the surface of the grinding wheel for trimming the grinding wheel and wherein there is a direct gear connection between a spindle for moving the trim tool carriage and an adjusting spindle which is threaded into an adjusting nut which is rotatably supported on the grinding wheel carriage, and wherein brake means are provided for braking the gearing to prevent rotation of the adjusting nut and thus a change in the position of the grinding wheel carriage on the spindle when the trim tool spindle is rotated.

A further object of the invention is to provide a grinding device which is simple in design, rugged in construction and economical to manufacture.

The various features of novelty which characterize the invention are pointed out with particularity in the claims annexed to and forming a part of this specification. For a better understanding of the invention, its operating advantages and specific objects attained by its use, reference should be had to the accompanying drawings and descriptive matter in which there is illustrated and described a preferred embodiment of the invention.

GENERAL DESCRIPTION OF THE PREFERRED EMBODIMENT

Figure 1:
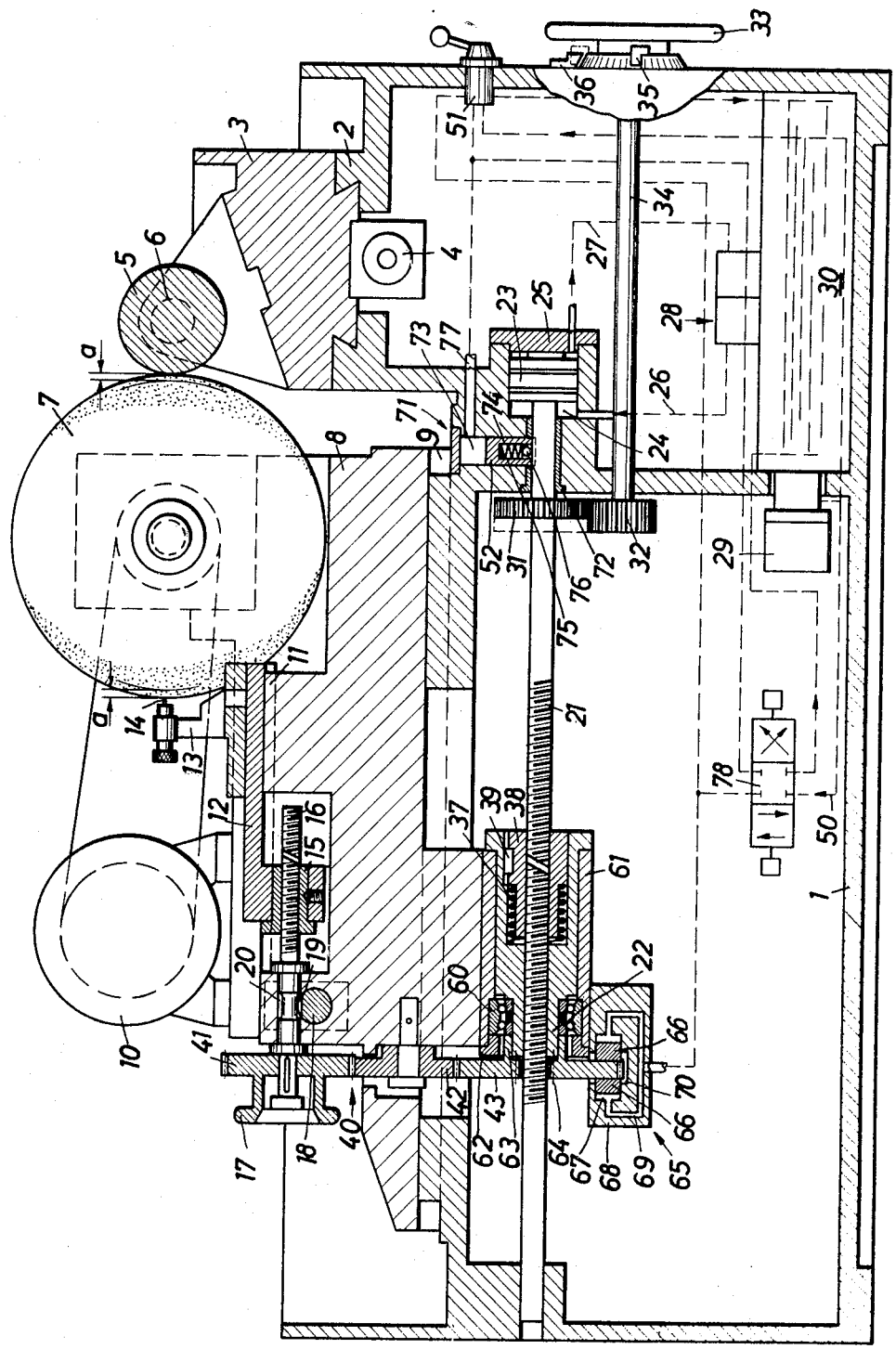
FIG. 1 is a transverse sectional view of a thread grinding machine constructed in accordance with the invention.

Referring to the drawings in particular, the invention embodied therein in FIG. 1 comprises a thread-grinding machine which includes a machine frame or bed 1 having longitudinal guides 2 for a work carriage or table 3 which is displaceable by a longitudinal drive 4 which, for example, may comprise a hydraulic drive or a draw or guide spindle. The work table 3 is shifted in order to impart to a workpiece 5 mounted on a mandrel 6 which is carried on the table, the necessary longitudinal movement during the grinding operation.

A grinding wheel 7 is rotatably supported on a grinding wheel carriage 8 which moves on cross rails 9 of the machine bed 1, and which can be displaced transverse to the workpiece axis. The grinding carriage 8 carries a driving motor 10 for rotating the grinding wheel 7. The carriage 8 is also provided with guides 11 which extend transversely to the grinding wheel axis and provide transverse guides for a trimming carriage 12. The trimming carriage 12 carried a holder 13 for a trimming tool 14 which for example, can be a diamond trimmer or a rolling tool such as a profile roller.

The trimming carriage 12 may be shifted to engage the tool 14 with the surface of the grinding wheel 7 by the rotation of a trimming spindle 16 which is in threaded engagement with a nut 15 of the carriage 12. This rotation may be accomplished manually, by rotating a hand wheel 17 which is connected to the spindle 16, or by a drive mechanism which includes a hydraulic operating piston gear 18 which carries a rack gear 19 which is in engagement with a gear 20 carried on the trim spindle 16.

In the event that the trimming operation is to be carried out to trim the grinding wheel 7 by an amount designated 'a' then the diameter of the grinding wheel 7 will diminish thus by the amount of two times 'a.' In order to make sure that the grinding wheel bears on the workpiece 5 during the next grinding operation with its same diameter there must be a shifting of the grinding carriage 8 toward the workpiece by the amount of the trimming dimension 'a' as indicated on the right side of the grinding wheel so that the abrasion of the grinding wheel caused by trimming will be compensated. This is accomplished, in accordance with the invention, by shifting the carriage 8 in respect to an adjusting spindle 21 by an amount corresponding to the trimming of the grinding wheel. This is effected by a drive connection through gearing 40 to effect relative shifting of the carriage 8 in respect to its associated adjusting spindle 21.

The adjusting gear for the grinding carriage 8 comprises an axially displaceable adjusting spindle 21 which is threaded into an adjusting nut 22 which is rotatably supported on the carriage 8 by roller bearings 60. For quick adjustment a hydraulic piston 23 which is rigidly connected with the spindle 21 is shifted in its associated fluid cylinder 24. The cylinder 24 is closed by a cover 25 which provides a connection piece for a pipe line 27. The line 27 connects through solenoid valves 28 to a fluid reservoir 30 and a line 26 which leads to the opposite side of the cylinder 24. Pressure produced by the pump 29 delivers oil from the reservoir 30 as controlled by the magnetic valve 28 in order to provide actuation of the piston 23. When the piston 23 is moved from the solid line position indicated to the left it provides a shifting of the spindle 21 and the shifting of the gear 31 thereon to the dotted line position at which it maintains meshing engagement with a gear 32 carried on a hand wheel shaft 34, the latter being rotatable by a hand wheel 33. This shifting by the piston 23 provides for the rapid return stroke of the grinding carriage 8 by the threading of the spindle 21 in respect to its associated nut 22 which is carried by the carriage. The hand wheel 33 has a limit stop 35 which is engageable with a fixed lug 36 when the shaft 34 is moved by an amount corresponding to the setting amount.

The adjusting nut 22 is provided with an end having a recess in which is fitted an insert 38 which also carries a female thread which is engaged with the spindle 21. The insert 38 is secured against rotation relative to the associated nut 22 by a sliding key 39 which is only axially displaceable between end flank portions.

In accordance with a feature of the invention the adjusting nut 22 is connected to an end gear 43 of the gearing 40 which also includes an intermediate gear 42 and hand wheel gear 41 which is affixed to the spindle 16 for rotation therewith. The intermediate gear 42 is rotatably supported on the carriage 8. In the embodiment shown, the intermediate gear has a gear ratio of 1 to 1 so that the thread pitch of the spindles 16 and 21 are the same. This intermediate gear 40 can naturally be adapted to accommodate any pitch differences between these two spindles 16 and 21 in order to ensure that the compensation movement which is accomplished by the carriage 8 will correspond exactly to the amount of trimming movement.

Brake means or locking means are associated with the gearing and the nut 22 to prevent rotation of the nut in respect to the carriage 8 so that rotation of the adjusting spindle 21 will produce a movement of the nut with the carriage along the spindle at such times. In the embodiment illustrated in FIG. 1 the brake means comprises a hydraulic brake assembly generally designated 65 having a brake cylinder 67 with brake elements or pistons 66, 66 mounted on each side of the end gear 43 in a position such that they may be caused to press against this gear from opposite directions and hold it against rotation relative to the carriage mounting for the nut 22 when a sufficient pressure is applied on each side of these elements through fluid pressure lines 69 and into recess 70, defined in a block housing 68. The pressure is supplied by the pump 29 and in accordance with the setting of a hydraulic-magnetic control device or reversing valve 78 which is connected through line 50 to the reservoir 30. Depending on the set of the member 78 the braking mechanism 65 is either locked with or released from the associated gear 43 and nut 22.

The locking system of the feed spindle 21, which operates with fixed stops at the machine housing and at the hand wheel does not eliminate the possibility of undue play between the tooth flanks and gears between the hand wheel shaft and the feed spindle. In ground gears, this clearance is extremely small. According to the invention, it can be eliminated altogether by a second hydraulic brake 71 which locks the feed spindle 21 directly. This hydraulic brake is disposed within a bearing 72 of the feed spindle and has at least one brake piston 52. The cylinder chamber 73 again communicates with the pressure medium line 50.

The brake piston 52 contains a return spring 74 which is supported by the bottom of a recess 75 and acting upon a ball 76 which, in turn, supports itself against the cylindrical part of the feed spindle 21. The point of contact of the ball with the cylindrical shaft of the feed spindle is virtually frictionless. The return force of the spring lifts the brake piston 52 off the feed spindle 21. When line 77, communicating with the cylinder chamber 73, is put under pressure, the brake piston or pistons 52 will rest tightly against the feed spindle, locking it directly. A possible backlash between the tooth flanks of gears 31 and 32 is thus made harmless.

The alternating actuation of brakes 65 and 71 is accomplished either through the manual control valve 71 designed as reversing valve, or through the control device 78. In the event the hydraulic brakes should be replaced by brakes actuated electromagnetically, the control device 78 is designed in the form of a reversing switch.

The method of operation of the machine is as follows:

For the normal grinding operation, the gear 43 and the nut 22 are locked by the control device 78 so that rotation of this spindle 21 will cause the advancing movement of the carriage therealong in accordance with the grinding requirements for the workpiece 5. The grinding setting may be set by the limiting stop 35 and rotation of this spindle 21 may be produced by turning the hand wheel 33. When the stop 35 reaches the lug 36 no further rotation of the spindle 21 can be effected.

After the grinding operation, the trimming of the grinding wheel 7 can be effected if necessary. The grinding wheel may be trimmed automatically either by a manual feed effected through the hand wheel 17 or by the operation of the piston 18 and rack gear 19. The trimming operation can only be effected, however, only after the brake means 65 are positioned in a nonlocking arrangement by the control 78. The same control may also be effected through the solenoid valve 28. The pressure of the braking force applied to the piston element 66, 66 may also be removed, for example by operating the hand valve 51. When the brake is not applied, however, the rotation of the trim spindle will cause a corresponding rotation of the gear 43 through the gearing 40 to produce a rotation of the nut 22 and a shifting of the carriage 8 relative to the spindle 21 in the amount corresponding to the amount of movement of the tool 14 in respect to the surface of the grinding wheel 7. The spindle 21 does not rotate because it is locked by the limit stop 35 which engages with the lug 36. When the pitches of the two spindles 16 and 21 are the same, or equalized through the gearing 42, the carriage 8 will perform a compensating movement in the same amount and the same direction as the movement of the trimmer.

Once again after the trimming operation is completed, the adjusting nut 22 is locked by the coil pressure acting on the elements 66, 66 so that rotation of the spindle 21 may be again initiated to shift the carriage 8 as required by the grinding operation.

Figure 2:
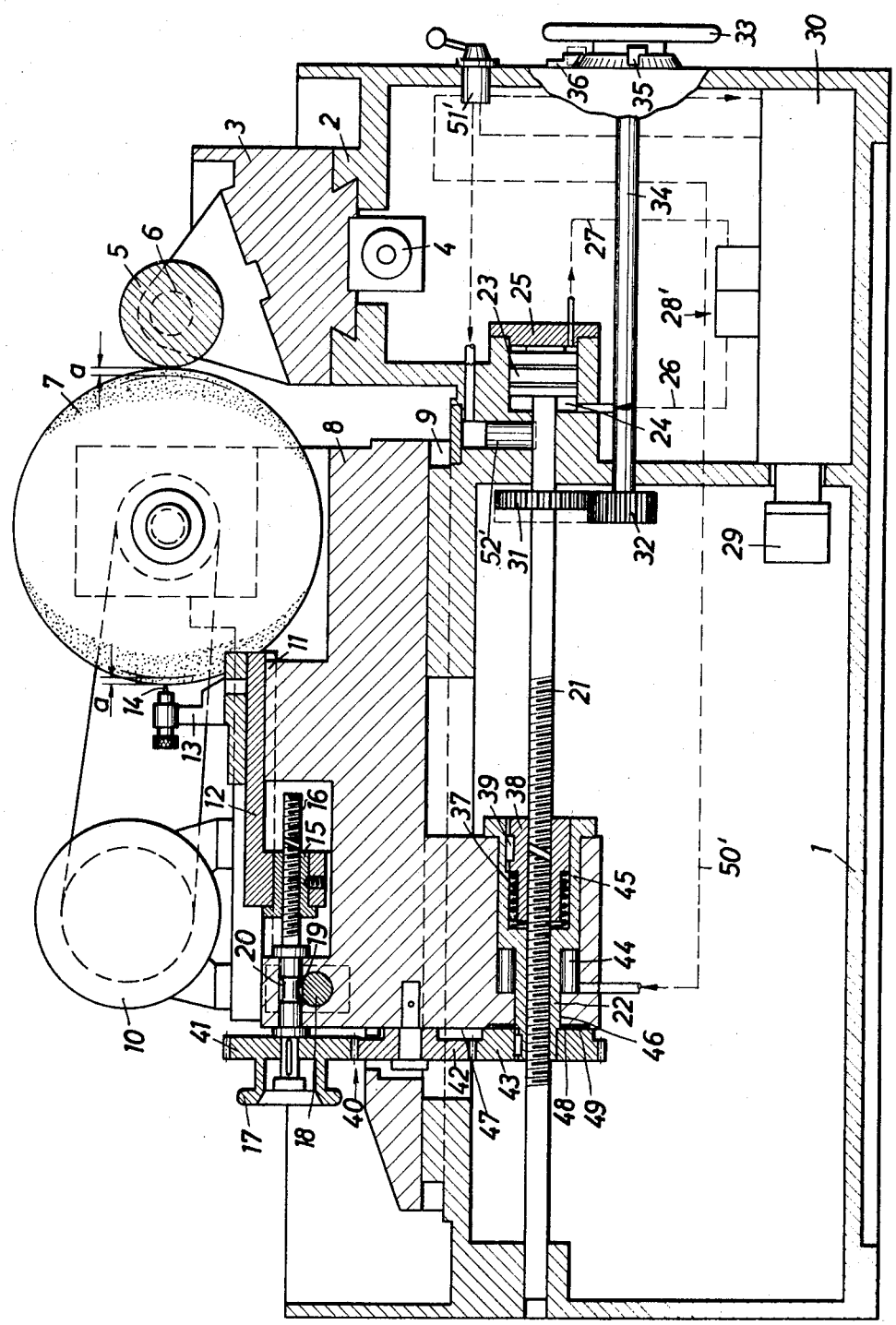
FIG. 2 is a view similar to FIG. 1 of another embodiment of the invention.

In the embodiment of FIG. 2, parts which are substantially identical with those of FIG. 1 are similarly designated. The braking means or locking means for the gear system 40 and the adjusting nut are of slightly different construction.

The adjusting nut 22 is a part of a hydraulic brake whose cylinder is designated with 44 and whose piston is designated with 45. The adjusting nut 22 carries this piston 45 as shown in the drawing at its right end, and the gear 43 is affixed to the opposite end. The adjusting nut 22 is cylindrical and is guided in a bore 46 of the grinding carriage 8 and it is also rotatable. This bore 46 is arranged concentrically to the cylinder chamber 44. The braking is effected by the oil pressure acting on the piston 45 between the end face 47 or a brake element 48 inserted into it and the side face 49 of the gearwheel 43 bearing on it. The oil pressure for closing the brake is produced by the pump 29, which is connected through line 50' with the cylinder chamber 44 under the control of the hand valve 51'. Depending on the position of the hand valve 51' the cylinder chamber 44 is either pressure-free or it is under pressure. Instead of the hand valve 51' the magnetic or solenoid valves 28' can naturally also take over this control. By displacing the gearwheel 41 by the hand wheel 17 to the left, the compensation can be shut off and trimming of the grinding wheel without compensation is then possible. The hand valve 51' is also connected to the hydraulic brake 52' which comprises a locking mechanism for the adjusting spindle 21 as in the embodiment of FIG. 1.

For the normal grinding operation, the cylinder chamber 44 is under the oil pressure produced by the pump 29. The adjusting nut 22 is therefore locked against any rotation and the adjustment is effected as usual by turning the hand wheel 33. The limiting stop 35 is set to the depth of adjustment. When this depth has been reached, the stationary lug stop 36 is engaged by the limiting stop 35 of the hand wheel. After this grinding operation, the trimming can be effected, if necessary. To this end the grinding wheel is trimmed automatically either by manual feed on the hand wheel 17 or by the operating piston gear 18. But first the cylinder chamber 44, which had been under pressure all this time, is made pressure-free. The oil pressure is removed either by the adjustment of the hand valve 51' or the valves 28'. By rotation of the hand wheel 17 both the trimming spindle 16 and the adjusting nut 22 are turned so that the carriage is advanced along adjusting spindle 21 which is locked by the engagement of the limiting stop 35 and the stationary stop lug 36.

What is claimed is:

1. A grinding machine having means for adjusting the grinding wheel in respect to an adjusting spindle by an amount to compensate for the amount of the trimming of the grinding wheel by a trimming tool and particularly for thread-grinding machines, comprising a grinding wheel carriage for a grinding wheel which is movable toward and away from a workpiece to be ground, an adjusting nut rotatably supported on said grinding wheel carriage, a rotatable adjusting spindle threadably engaged with said adjusting nut, a trim tool carriage mounted for movement in directions to permit trim tool engagement with and disengagement from the grinding wheel on said grinding wheel carriage for trimming the wheel, a trim spindle nut on said trim tool carriage, a rotatable trim spindle threadably engaged with said trim spindle nut and being rotatable to shift said trim tool carriage relative to the grinding wheel on said grinding wheel carriage, gear means connected between said adjusting spindle and said trim spindle, and brake means for selectively locking said adjusting nut to permit advancing of said grinding wheel carriage with said nut along said adjusting spindle upon rotation of said adjusting spindle, and alternatively for releasing said adjusting nut to permit rotation of said adjusting nut and the shifting of the position of said grinding wheel carriage on said adjusting spindle upon driving of said trim spindle.

2. A grinding machine, according to claim 1, wherein said brake means comprises a fluid pressure actuated member.

3. A grinding machine, according to claim 1, wherein said brake means comprises a fluid cylinder, a member slidable in said cylinder and fluid pressure means for pressurizing said cylinder to move said member to engage said gear means.

4. A grinding machine, according to claim 3, wherein said member slidable in said cylinder comprises said adjusting nut.

5. A grinding machine, according to claim 3, wherein said gear means comprises a first gear affixed to said trim spindle and rotatable therewith, a second gear connected to said adjusting nut and rotatable therewith, said member displaceable in said fluid cylinder being engageable with said second gear.

6. A grinding machine, according to claim 5, including at least one gear engaged between said first and second gears, said gear means driving said adjusting spindle at the same speed as said trim spindle.

7. A grinding machine, according to claim 6, wherein said adjusting nut is affixed to said second gear.

8. A grinding machine, according to claim 7, including a piston connected to said adjusting spindle, and fluid pressure means for shifting said piston to move said adjusting spindle axially, said carriage being displaced during such axial movement of said spindle when said brake means is locked to said gear means.

9. A grinding machine, according to claim 8, including a hand wheel connected to said adjusting spindle for rotating said spindle, and stop means associated with said hand wheel for permitting rotation thereof by predetermined amount and subsequent locking thereof at the end of such rotation by said predetermined amount.

10. A grinding machine, according to claim 11, including a hand valve connected to said brake means for automatically releasing said brake means.

* * * * *